Patented Mar. 25, 1947

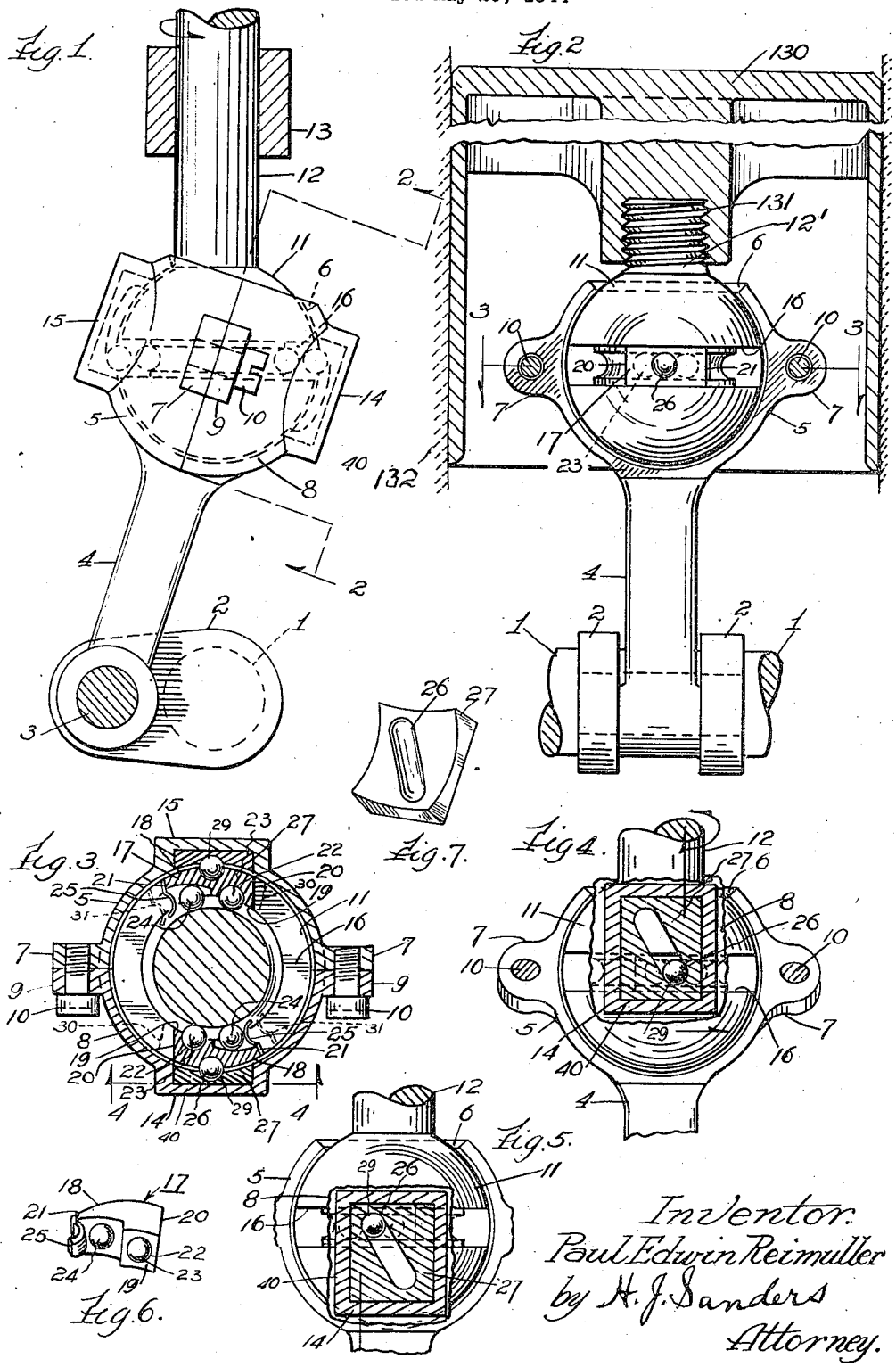

2,417,948

UNITED STATES PATENT OFFICE 2,417,948

POWER TRANSMISSION MECHANISM

Paul Edwin Reimuller, Chicago, Ill.

Application May 25, 1944, Serial No. 537,327

4 Claims. (Cl. 74—24)

This invention relates to improvements in power transmission mechanism. A prime object is to provide means for economically and efficiently transmitting power from a cylinder to a crankshaft or other point of delivery. More specifically the invention provides a ball and socket assembly for connecting a piston to a crankshaft. A further object is to provide means for revolving the piston while it reciprocates within the cylinder. Revolution of the piston in addition to its normal or usual movement insures its even wear as well as like wear of the cylinder wall and the piston rings and assures the maintenance of concentricity or the elimination of eccentricity.

A further object is to provide means insuring equal heat distribution over the cylinder wall or within the cylinder, maximum compression, longer cylinder, piston and piston ring life; to retard or prevent the formation of carbon between the piston rings and piston and between the piston and cylinder wall, and insure piston ring seal. In the instant structure the wrist pin is eliminated and an even expansion of the piston over all of its surface is had due to the resultant floating action afforded by the ball and socket assembly.

A further object is to provide power transmission mechanism for use in connection with pistons and cylinders wherein uniform lubrication of the moving parts is assured as desired, overheating prevented thus assuring maximum power delivery from minimum fuel consumption.

A further purpose of this invention is to provide a design whereby many difficult problems connected with power transmission involving the use of gasolene, oil or steam are eliminated thus providing means for a more efficient operation and maintenance. It is a known fact that cylinders wear unevenly causing almost insurmountable obstacles to compression maintenance as in the normal course of operation the piston rings almost become integral with the piston due to carbon formation and the formation of other foreign matter providing a seal.

As a result of this condition the cylinder has a tendency to warp and to wear more on one side than on another becoming distorted and permitting gases to bypass the piston rings and escape into the crank case of the engine causing damage. In many engines inserts in the form of sleeves are being placed in the cylinder. These inserts are made of stainless steel or other acid resisting metals which will eliminate the pitting effect of the acids created during cold operation. However, unless the piston and rings are revolved even stainless steel inserts can and will warp, wear elliptically permitting the escape of gases into the crank case. In honing a cylinder the hone must be revolved or oscillated during the reciprocating motion through the cylinder in order to maintain a true concentric bore—therefore by revolving the piston and rings in their normal operation they will be maintained concentric and the rings will not become fastened by carbon or other foreign matter to the piston. The elimination of the wrist pin in this design, a short stub piston rod being directly secured to the inner wall of the piston, will further insure even wear and carbon elimination.

With the foregoing and other objects in view the invention consists in the combination and arrangement of parts to be hereinafter fully described, pointed out in the claims and illustrated in the accompanying drawing which forms a part of this patent and in which—

Fig. 1 is a view in elevation and partly in section of an engine illustrating the application of the instant power transmission mechanism showing connection between the piston rod and crankshaft.

Fig. 2 is a view taken at right angles to Fig. 1 substantially on the line 2—2 thereof, a portion of the socket being removed, the piston and cylinder wall also being shown, the piston rod being shortened, threaded, and secured direct to the piston without the use of wrist pin, a modified form being disclosed.

Fig. 3 is a horizontal cross sectional view through Fig. 2 on the line 3—3 looking in the direction of the arrows.

Fig. 4 is a view partly in elevation and partly in cross section through Fig. 3 on the line 4—4 taken at the end of an oscillatory movement.

Fig. 5 is a view similar to Fig. 4 but taken at the opposite end of the stroke or movement.

Fig. 6 is a detail perspective view of a floating dog employed, and,

Fig. 7 is a view in perspective of a drive block employed.

Like reference characters denote corresponding parts throughout the several views.

The reference numeral 1 denotes a crankshaft, 2 the crank, 3 the crank pin engaged by the pitman 4 that is integral with the substantially hemispherical socket portion 5 having the beveled truncated portion 6 of 180 degrees extent, said socket portion being formed also with the oppositely disposed ears 7 perforated. An hemispherical cap 8 complementary to said socket portion 5 in all respects is received thereupon with the ears 9 perforated in alignment with the perforations in ears 7 to receive the screws 10 whereby said socket portions are releasably secured together, the truncate portions of cap 8 corresponding to that of portion 6 aforesaid.

Snugly received within socket 6, 8 for full floating movement is the ball shaped head 11 at the end of the piston rod 12 arranged in bearing 13 and connected to the piston. In Fig. 3, modification, this piston rod is shortened and connected directly to the piston within same without the use of a wrist pin by threads 131, the piston 130 being shown in cylinder 132. The said cap and socket portions are formed respectively with diametrically opposed rectangular extensions 14, 15 of identical formation positioned midway between the ears of each socket portion or ninety degrees from each ear.

The cut away portion of the socket is of a diameter sufficient to provide clearance for its movement relative to the ball 11 and piston rod 12. Formed peripherally completely about the ball 11 horizontally and centrally is the ball race 16 in which are arranged the twin oppositely disposed free floating substantially wedge shaped dogs 17, 17 each having a segmental outwardly disposed peripheral wall 18, a stepped inner wall 19, one square shaped large end wall 20 and a very narrow opposite end wall 21, each dog having a transverse uniform thickness permitting it to be snugly and slidably received in said race 16. In the inner face at the thicker end of each dog is formed a round semi-ball shaped depression 22 to receive the snug fitting ball 23 that also rides in the said race 16 to guide the dog within the said race. Disposed upon the inner face of each dog 17 upon its narrower wedge shaped portion is another ball 24 that serves as the piston reciprocates to impart a rotary movement thereto, to the piston rod and to the ball 11, said ball 24 also riding in said race 16 and being retained against displacement by a spring 25 secured to the narrow edge or end of said dog.

Said floating dogs 17, 17 are also formed upon their peripheral walls 18 with semi-ball shaped recesses 26 registering with race grooves 40 formed in the inner faces of drive blocks 27 of counterpart formation, their inner faces beveled complementary to the ball periphery, snugly received in the oppositely disposed rectangular extensions 14, 15, each pair of recesses and grooves 26, 40 snugly receiving a dog-impelling ball 29 movable back and forth from end to end of said groove 40 thus oscillating said dogs from a point 30 in the race 16 to a point 31 therein. It will be noted that the dogs 17 are arranged within the race 16 with their narrower ends disposed in opposite directions while their recesses 26 in register with recesses 40 in said drive blocks are disposed in opposite directions.

Thus it is that as said rod 12 reciprocates said crankshaft is rotated, a rocking movement imparted to socket 5, 8 causing balls 29 to travel back and forth in the grooves 40 in block 27 and reciprocating movement in opposite directions to the floating dogs 17, 17 and causing balls 24, 24 to impart a rotary movement to ball 11, rod 12 and the piston. From the axial position of the pitman 4, which is 90 degrees from the position shown in Fig. 1, the extensions 14, 15 will be horizontally disposed and the balls 29 will be located centrally of the grooves 40 of blocks 27. A further movement of 90 degrees from axial position will dispose extensions 14, 15 in oppositely tilted positions to that shown in Fig. 1 with the balls 29 at relatively opposite ends of the grooves 40 to that shown dotted in Fig. 1. During this movement through 180 degrees from Fig. 1 position the balls 29 have moved from end to end of the grooves 40 thus impelling the dogs 17 from point 30 to point 31 thus causing the balls 24 to frictionally engage the ball 11 and partially rotate same and piston rod 12 in the direction denoted by the arrow at the upper end of piston rod 12, Fig. 1. The further movement of the piston rod 12 will cause the socket 6, 8 through blocks 27 and balls 29 to return the dogs 17 to their former positions. One complete revolution of the crankshaft or one complete up and down stroke of the piston causes one back and forth movement of balls 29 in grooves 40. From the Fig. 1 position, which shows the down stroke one-half completed, through an arc of 180 degrees or to a position of one-half completion of the up stroke is an idle movement as far as piston rotation is concerned. The second half of the complete stroke is the work movement. Thus an intermittent rotary movement is imparted to the ball 11, piston rod 12 and piston 3, always in the direction of the arrow, Fig. 1, as the mechanism operates.

What is claimed is:

1. In a power transmission mechanism, a ball, a ball race formed peripherally of said ball, a socket receiving said ball, diametrically opposed blocks carried by said socket formed with oppositely disposed ball races, dogs carried in said first named ball race contiguous to said blocks formed with ball grooves registering with said inclined ball races, and ball connection between said dogs and said first named ball race and between said dogs and said blocks.

2. In a power transmission mechanism, a reciprocating ball, a ball race formed peripherally of said ball, a socket receiving said ball, diametically opposed blocks carried by said socket having their inner faces recessed complementary to the ball periphery and formed in said faces with oppositely inclined ball races, floating dogs arranged in said first named ball race contiguous to said blocks formed with ball grooves registering with said inclined ball races, said dogs being formed with stepped inner faces each having a ball groove, balls engaging the inner stepped faces of said dogs and said first named ball race, one of said balls disposed in an inner face recess, and balls disposed in said inclined ball races and the adjacent ball grooves in said dogs.

3. In a power transmission, a ball, a horizontal ball race formed in said ball, a socket receiving said ball freely, diametrically opposed blocks carried by said socket formed with oppositely disposed ball races, substantially wedge-shaped dogs arranged in said first named ball race contiguous to said blocks formed with ball grooves registering with said inclined ball races, the narrow ends of said dogs being disposed in opposite directions, said dogs being formed with stepped inner faces, balls engaging the inner stepped faces of said dogs and said first named ball race, balls disposed in said inclined ball races and the adjacent ball grooves, and springs carried by said dogs for engagement with one of said balls.

4. In combination, a reciprocating ball, a ball race formed in said ball, a socket receiving said ball freely, and means connecting said socket and ball for transmitting motion from said ball through said socket and for imparting a rotary movement to said ball as same reciprocates, said means including oppositely disposed wedge-shaped dogs arranged in said ball race, corresponding ends of said dogs being disposed in opposite directions.

PAUL EDWIN REIMULLER.

REFERENCES CITED

The following references are of record in the file of this patent:

UNITED STATES PATENTS

| Number | Name | Date |
|---|---|---|
| 1,474,325 | Kallmeyer | Nov. 13, 1923 |
| 1,637,765 | Comstock | Aug. 2, 1927 |
| 47,850 | Moulton | May 23, 1865 |